(12) United States Patent
Darday

(10) Patent No.: US 7,049,720 B2
(45) Date of Patent: May 23, 2006

(54) VARIABLE RATIO TORQUE CONVERTER

(76) Inventor: Stephen Darday, 12 Barker Street, East Brisbane, Qld (AU) 4169

( * ) Notice: Subject to any disclaimer, the term of this patent is extended or adjusted under 35 U.S.C. 154(b) by 124 days.

(21) Appl. No.: 10/506,354

(22) PCT Filed: Mar. 4, 2003

(86) PCT No.: PCT/AU03/00260

§ 371 (c)(1),
(2), (4) Date: Sep. 2, 2004

(87) PCT Pub. No.: WO03/075440

PCT Pub. Date: Sep. 12, 2003

(65) Prior Publication Data

US 2005/0104465 A1    May 19, 2005

(30) Foreign Application Priority Data

Mar. 4, 2002 (AU) .................................. PS 0837

(51) Int. Cl.
*H02K 7/06* (2006.01)

(52) U.S. Cl. ........................................ 310/80; 103/113
(58) Field of Classification Search ................ 310/80, 310/92, 96, 103, 105, 112–114, 182
See application file for complete search history.

(56) References Cited

U.S. PATENT DOCUMENTS

| 3,523,204 | A | * | 8/1970 | Rand ............................. 310/94 |
| 4,532,447 | A | * | 7/1985 | Cibie ........................... 310/114 |
| 5,565,723 | A |   | 10/1996 | Dastidar |
| 5,675,203 | A |   | 10/1997 | Schulze et al. |
| 5,917,248 | A | * | 6/1999 | Seguchi et al. ................ 290/31 |

FOREIGN PATENT DOCUMENTS

GB        2 307 109        5/1997

* cited by examiner

*Primary Examiner*—Thanh Lam
(74) *Attorney, Agent, or Firm*—Young & Thompson

(57) ABSTRACT

Provided is a variable ratio torque converter including an input member for connection to a primary drive, an output member coupled to a torque multiplying member for connection to drive a load. The input member has paired permanent magnet poles, and the output member has a plurality of pairs of movable periphery magnets per pole, and a winding arranged for each peripheral magnet pairs. The windings are connected to a controllable inverter arranged to control torque from the torque multiplying member. The input and output members are arranged so that they rotate together under magnetic force. The peripheral magnets cause the windings to produce a slip related control signal for the inverter to control the torque. The converter may include a slip responsive arrangement for retarding actuation of the peripheral magnets to thereby delay movement when there is a slip between respective speeds of the input and output members.

12 Claims, 11 Drawing Sheets

VARIABLE RATIO TORQUE CONVERTER

TECHNICAL FIELD OF THE INVENTION

THIS INVENTION relates to a variable ratio torque converter, and in particular but not limited thereto, a hybrid drive having an internal combustion engine connected to a variable ratio torque converter arranged to control torque.

BACKGROUND OF THE INVENTION

Engine driven apparatus such as an automobile, generally use a mechanical transmission to control torque for driving the wheels. To move the apparatus from idling or travelling in an inclined orientation, a larger torque is required than when the apparatus is already travelling in a relatively level surface or travelling in a declining orientation. A transmission is used to change the torque so that the engine can continue to run smoothly.

The transmission is either an automatic type or a manual type. Both the manual type transmission and the automatic type transmission are complex in design. They have gears with different number of teeth. Transmissions for semi trailers have about 12 to 15 gears. The manual type transmission requires a mechanical clutch to disengage the transmission from the engine when shifting gears or idling. The automatic type transmission does not have a clutch, instead it uses a fluid coupling, clutches usually two, bands usually, oil pumps, servos, control valve assembly, governor, and other components connected between the engine and the transmission. About two gallons of oil is also required.

The above transmissions have discrete gear changes which are noticeable when changing gears. Toyota Prius, a hybrid car, uses a complicated planetary gear set to control a variable pitch pulley arrangement which acts as a continuously variable transmission (CVT). The gear set and the pulley arrangement are bulky and the car body is specially designed to accommodate components around them. Accordingly, the gear set and the pulley arrangement cannot be retrofitted into other vehicles.

The prior art transmissions require regular maintenance to ensure that the gears or the gear/pulley set up are properly positioned, in good order and that there is sufficient oil. Loss of oil pressure would invariably damage the transmission components. Therefore, the casings of these transmissions must have a sealing arrangement that would prevent oil leak at high operating temperatures.

OBJECT OF THE INVENTION

An object of the present invention is to alleviate or to reduce to a certain level one or more of the prior art disadvantages.

SUMMARY OF THE INVENTION

In one aspect therefore the present invention resides in a variable ratio torque converter including an input member for connection to a primary drive, an output member coupled to a torque multiplying member for connection to drive a load. The input member has paired permanent magnet poles, and the output member has a plurality of pairs of movable periphery magnets per pole, and a winding arranged for each peripheral magnet pairs. The windings are connected to a controllable inverter arranged to control torque from the torque multiplying member. The input member and the output member are arranged so that the output member rotates with the input member under magnetic force. The moving peripheral magnets cause the windings to produce a slip related control signal for the inverter to control the torque from the torque multiplying member.

In another aspect therefore the present invention resides in hybrid drive for a vehicle. The hybrid drive for a vehicle includes an internal combustion engine and a variable ratio torque converter having an input member for connection to the engine, an output member coupled to a torque multiplying member for connection to drive at least one wheel of the vehicle. The input member has paired permanent magnet poles, and the output member has a plurality of pairs of movable periphery magnets per pole, and a winding arranged for each peripheral magnet pairs. The windings are connected to a controllable inverter arranged to control torque from the torque multiplying member. The input member and the output member are arranged so that the output member rotates with the input member under magnetic force. The moving peripheral magnets cause the windings to produce a slip related control signal for the inverter to control the torque from the torque multiplying member.

In preference, the converter further includes a slip responsive retard arrangement for retarding actuation of said peripheral magnets to thereby delay movement when there is a slip between respective speeds of the input member and the output member.

The input member may have an input shaft with the paired permanent magnet poles fixed thereon. The paired permanent magnet poles may be arranged around one or more circular elements.

The peripheral magnets may be arranged to move in a rotational or translational manner. Preferably, the peripheral magnets are arranged to rotate about respective axes which are parallel to or move laterally from the axial axis of the input member. More preferably, the peripheral magnets are arranged to rotate in steps of about 180°.

The slip responsive retard arrangement may have at least one delay zone where a peripheral magnet therein is maintained stationary and at least one actuating zone where a peripheral magnet therein is caused to move. The peripheral magnets of each pole therefore moves one at a time when an opposed pole of the input member rotates thereacross. The delay zone(s) and the actuating zone(s) may be formed with one or more contoured surfaces arranged to provide a delay before actuating said peripheral magnets to move when there is a slip between the input member and the output member. Said one or more contoured surfaces are preferably in the form of a series of alternating ridges and troughs. The sides between the series of alternate ridges and troughs are preferably shaped to cause the peripheral magnets to accelerate to a maximum speed and then decelerates to return to stationary between the steps. The ridges and the troughs are sized to provide a stationary time period between steps, thereby providing said delay.

In one form, the actuating arrangement has a first disc and a second disc coupled to rotate with the input member. Each of the first and second discs has a contoured circumferential surface arranged to actuate the peripheral magnets to move after a delay. A spacer can be arranged between the two discs.

The peripheral magnets may have a key arranged to follow a contoured surface. Alternatively, the peripheral magnets may have crank means arranged for actuation by the contoured surfaces of the first and second discs.

The controllable inverter may be any known inverter such as that available from AP Controls Pty Ltd, Unit 4, 10 Welch Street, Underwood, Queensland, Australia. Preferably, the inverter is a pulse width modulation (PWM) type.

The torque multiplying member may be a motor/generator which can be controlled to operate as a motor or as a generator. When operating as a generator, the motor/generator may be arranged recharging a battery.

The vehicle may include a car, truck of any size, semi-trailer as well as diesel-electric locomotive.

The torque converter is preferably arranged for use as a variable ratio transmission for fitting into a vehicle. As such, it accepts as a plug in, hybrid drive component allowing modifying a standard internal combustion engine vehicle to be a hybrid vehicle. The vehicle may at any time revert to non-hybrid vehicle, by unplugging the plugin components such as a battery pack, solar cells, or any fuel cells.

When the converter is operating the ratio of the torque from the primary drive to the torque from the torque amplifying member is 1:1. During slippage, the ratio is 1:(1+x), where x is a value derived from the currents in the windings.

While the torque converter is in slippage, the input member rotates at a faster speed than the output member. As such, the peripheral magnets of each pole will be influence by magnetic repulsion force of the like polarity of the magnetic poles of the input member to move to change their positions, one by one. Movement of the peripheral magnets causes a travelling magnetic flux across the windings and thereby induces current in the windings. Brushes or slip rings can be arranged to collect the generated current for feeding to the inverter where a value x corresponding to the generated current is used to control the torque to change the torque to 1+x.

BRIEF DESCRIPTION OF THE DRAWINGS

In order that the present invention can be more readily understood and be put into practical effect reference will now be made to the accompanying drawings which illustrate one preferred embodiment of the invention and wherein.

DETAILED DESCRIPTION OF THE DRAWINGS

Figure 1:
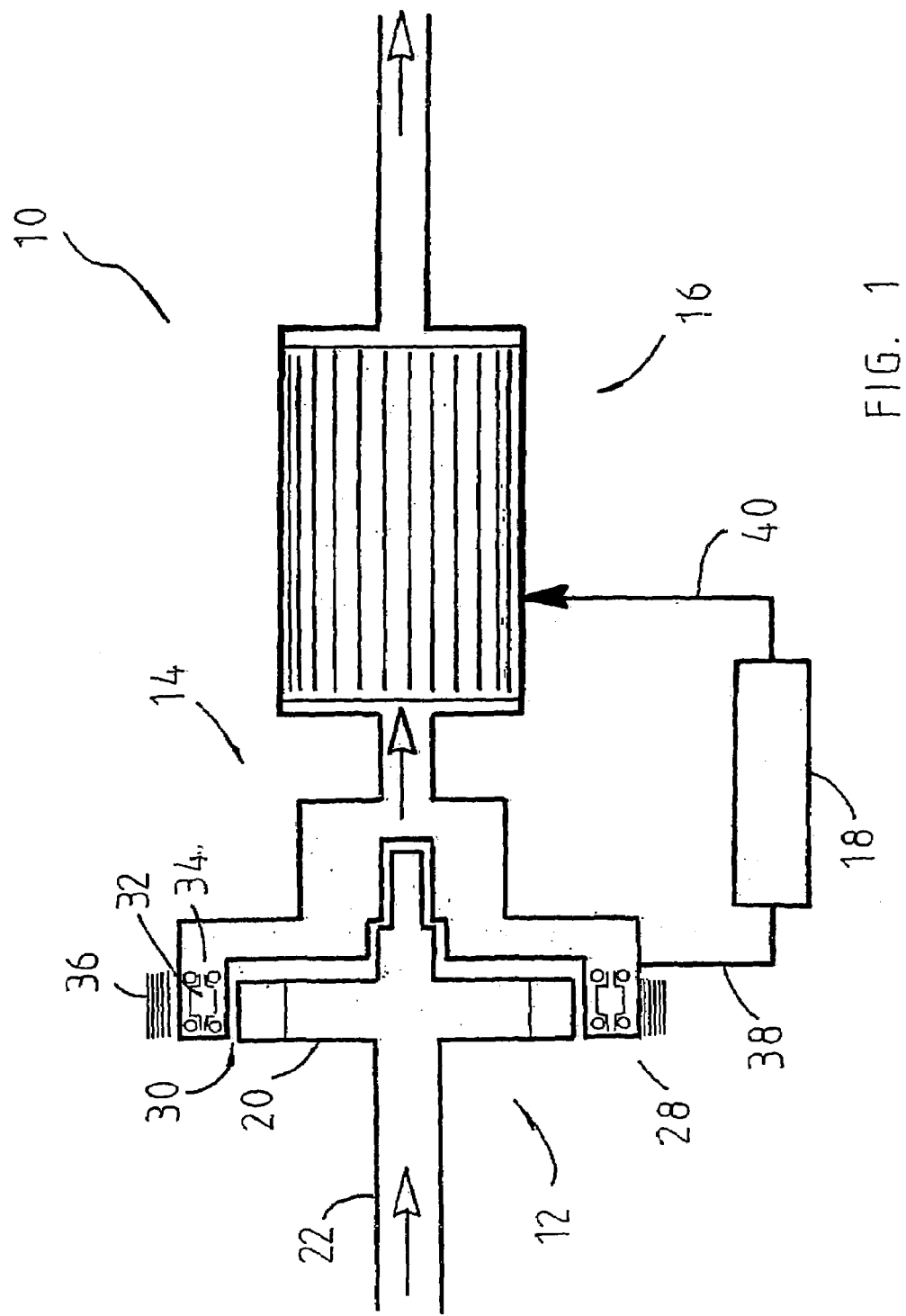
FIG. 1 is a schematic side view of an embodiment of the variable ratio torque converter according to the present invention.
Figure 2:
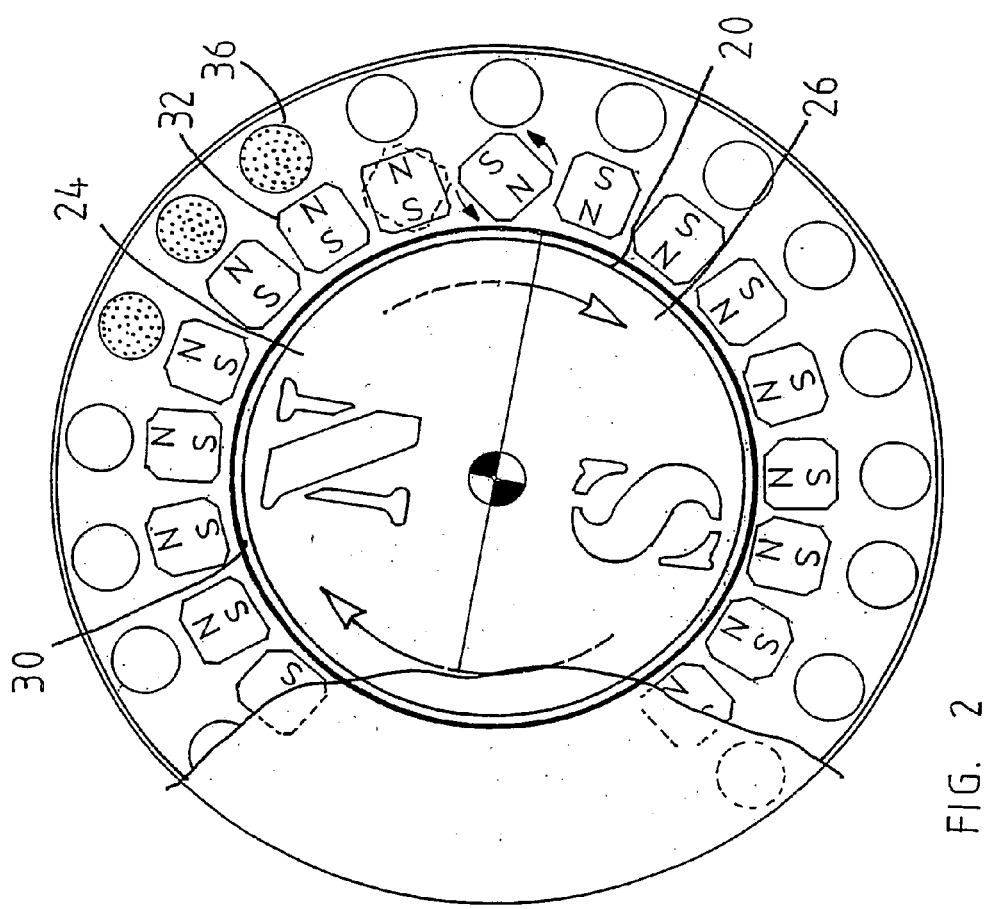
FIG. 2 is a schematic end view of then embodiment shown in FIG. 1.

Referring to FIG. 1 there is shown an embodiment of the variable torque converter 10 according to the present invention. The converter 10 has an input member 12 arranged for connection to a primary drive such as an internal combustion engine (not shown) be driven thereby, an output member 14 coupled to a torque multiplying member 16 which may a variable torque motor or motor-generator. The multiplying member 16 can be arranged to directly drive a wheel or wheels of a vehicle (not shown), or indirectly via connection to a form of power transfer arrangement such as a differential gear set, a tail shaft or an axle. A controllable inverter 18 is provided for controlling torque from the multiplying member 16. As shown more clearly in the partial cut-away view in FIG. 2, the input member 12 has a rotor 20 fixed on an input shaft 22 which is for connection to the primary drive, so that when the primary drive is operational the rotor turns at a speed controlled by the primary drive. The rotor 20 in this embodiment has a pair of opposed poles 24 and 26. It is understood that the rotor 20 can have any number of poles. The output member 14 has a peripheral flange 28 extending about the rotor 20 with an air gap 30 therebetween. The peripheral flange 28 has a group of ten peripheral magnets 32 for each of the poles 24 and 26, and the magnets 32 are rotatably mounted in bearings 34. It is also understood that the output member 14 can have any number of peripheral magnets 32. A winding 36 is located opposite each pole 32 or a pair of the diametrically opposed poles 32. Slip rings (not shown) or other suitable current collectors are used to collect currents generated by the windings 36 and to feed the current to the inverter 18 by way of wires shown as the line 38. In some cases, diodes may need to be incorporated to convert AC currents to DC currents. The inverter 18 in this embodiment is a PWM type and it modulates the pulse width in a control signal transferred through a line 40 to the multiplying member 16.

Referring again to FIG. 2, the rotor 20 rotates in a clockwise direction and the "N" polarity 24 of the rotor 20 causes the group of peripheral magnets 32 with the like pole adjacent to the air gap 30 to turn one at a time under magnetic repulsion force to present their opposite pole adjacent to the air gap 30. The peripheral magnets 32 turns in the anticlockwise direction. As shown, one of the peripheral magnets 32 has just rotated 180° to present its "S" polarity at the air gap 30 and an adjacent peripheral magnet 32 is still rotating.

Figure 3:
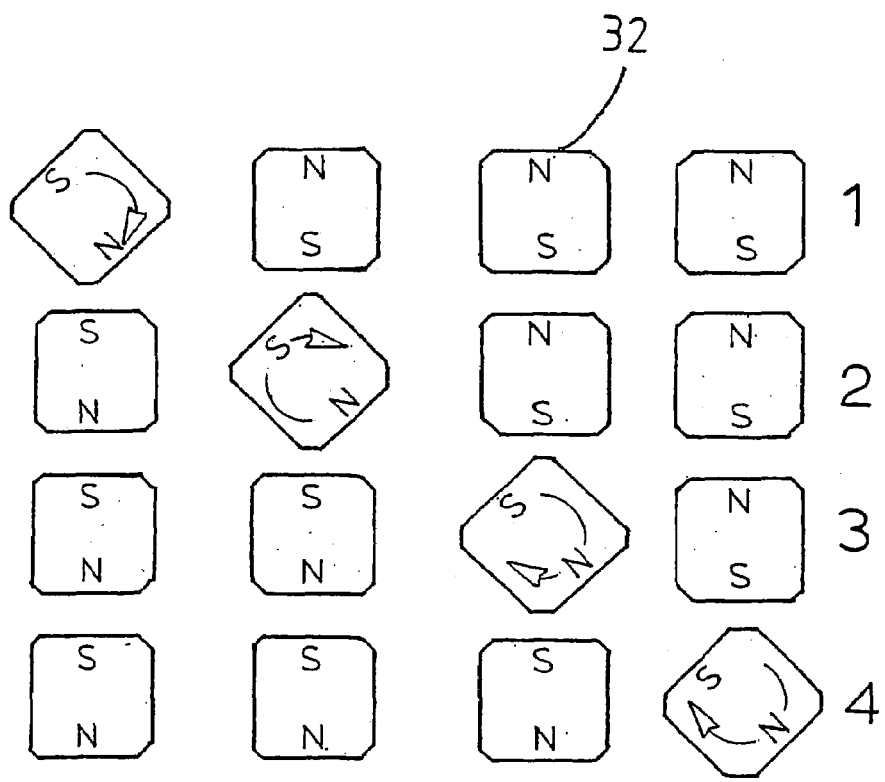
FIG. 3 shows an example of the movements of the peripheral magnets of the output member shown in FIG. 1.

FIG. 3 shows the states of four of the peripheral magnets 32 as the "N" polarity 24 of the rotor 20 travels there across. As schematically depicted, the pole 24 travels from left to right. The peripheral magnets 32 turns one at a time as shown in stages 1 to 4, until all four magnets 32 present their "S" polarity at the air gap 30.

Figure 4:
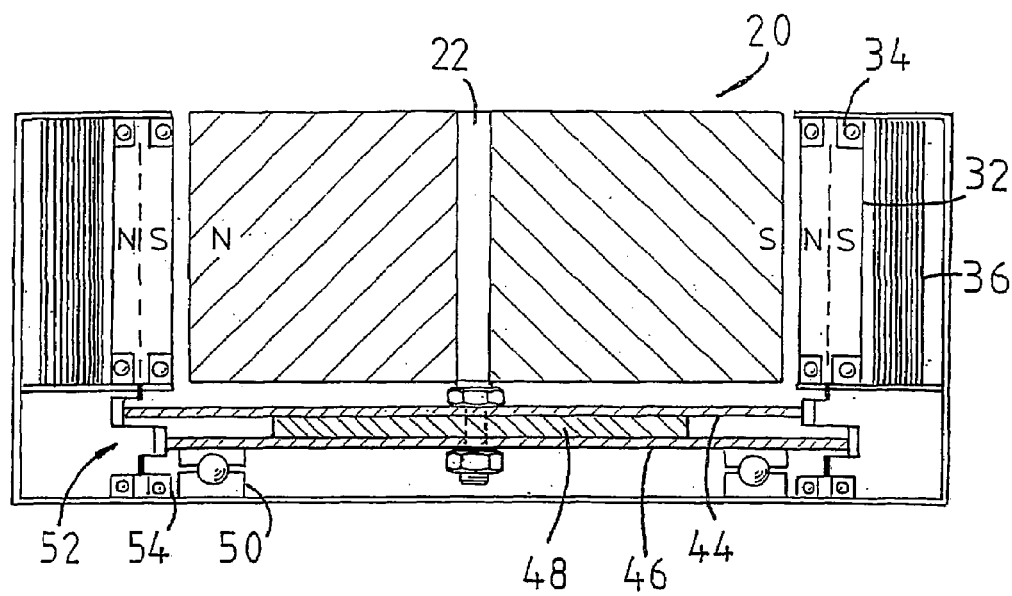
FIG. 4 shows a cross-section view of the input and output members shown in FIG. 1.
Figure 5:
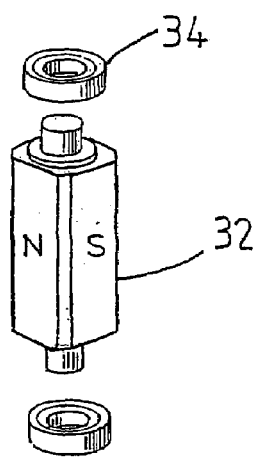
FIG. 5 shows in detail one of the peripheral magnets shown in FIG. 1.

FIG. 4 shows a form of the slip responsive retard arrangement 42 for the converter 10. The arrangement 42 has a first disc 44 and a second disc 46 mounted on the shaft 22 of the input member 12. A spacer 48 is provided between the discs 44 and 46. The first disc 44 and the second disc therefore rotate with the shaft. Bearings 50 rotatably support the disc 46. The peripheral magnets 32 as shown are supported in bearings 34. One of the magnet 32 and the associated bearings 34 are sown in FIG. 5. A double crank arrangement 52 is coupled to each of the peripheral magnets 32 at one end thereof and supported in bearings 54 at the other end thereof.

Figure 6:
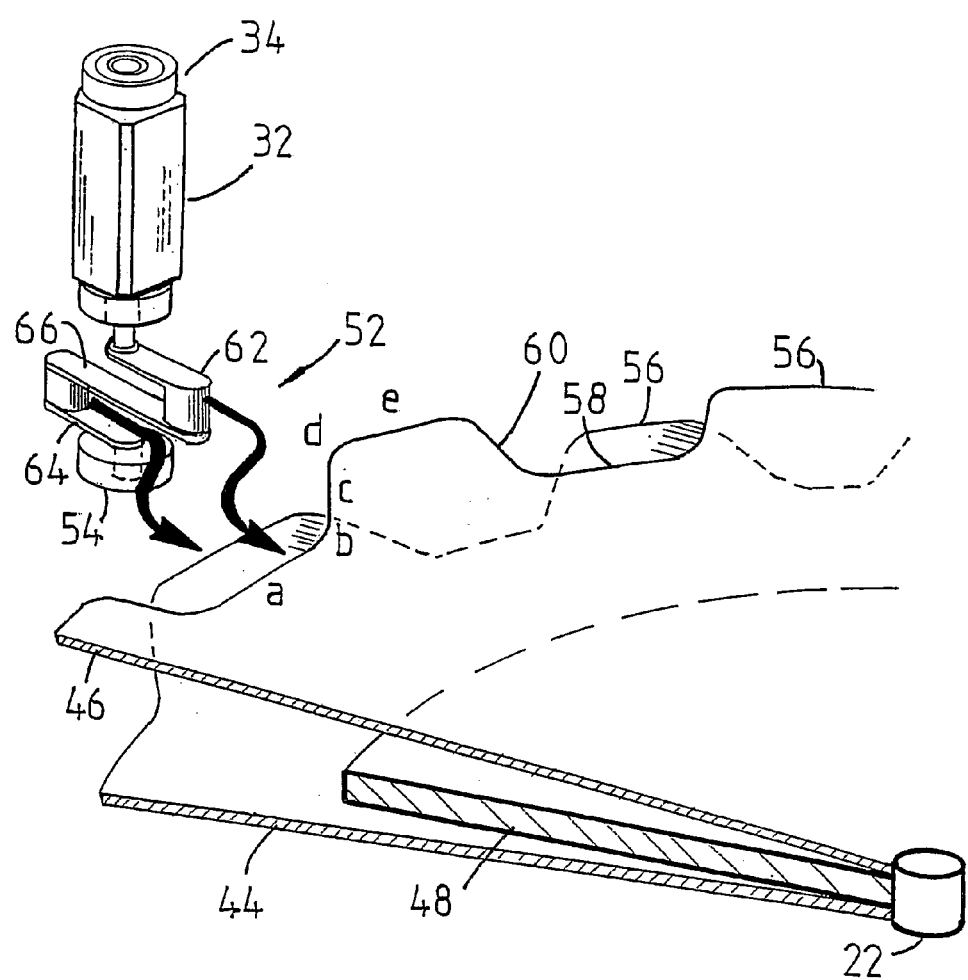
FIG. 6 shows the slip responsive actuating arrangement for turning the peripheral magnets shown in FIG. 1.

Referring to FIG. 6, the double crank arrangement 52 has a first crank arm 62 and a second crank arm 64. A link arm 66 links the two arms 62 and 64 together so that the arms 62 and 64 move in unison. The crank arm 62 is coupled to a peripheral magnet 34 and the other crank arm 64 is rotatably supported by the bearings 54. Each of the discs 44 and 46 has alternating ridges 56 and troughs 58, which are arranged so that the arm 62 rests on a ridge 56 or a trough 58 of the disc 46, while the second crank arm 64 rests on a trough 58 or a ridge 56 of the disc 44. The sides 60 joining the ridges 56 and the troughs 58 are shaped to accelerate movement of the magnets 32 to full speed before deceleration. When the crank arm 62 is int zones "a" or "e", a peripheral magnet 32 therein are stationary, whereby movement of the magnet 32 is delayed. When the crank arm 62 moves to zone "b", the side 60 causes the arm 62 to lift and thereby causing the magnet 32 to accelerate. When the crank arm 62 is in zone "c", the magnet 32 moves at full speed. Thereafter the speed of magnet 32 decelerates when the crank arm 62 moves to zone "d" and returns to stationary in zone "e".

Figure 7:
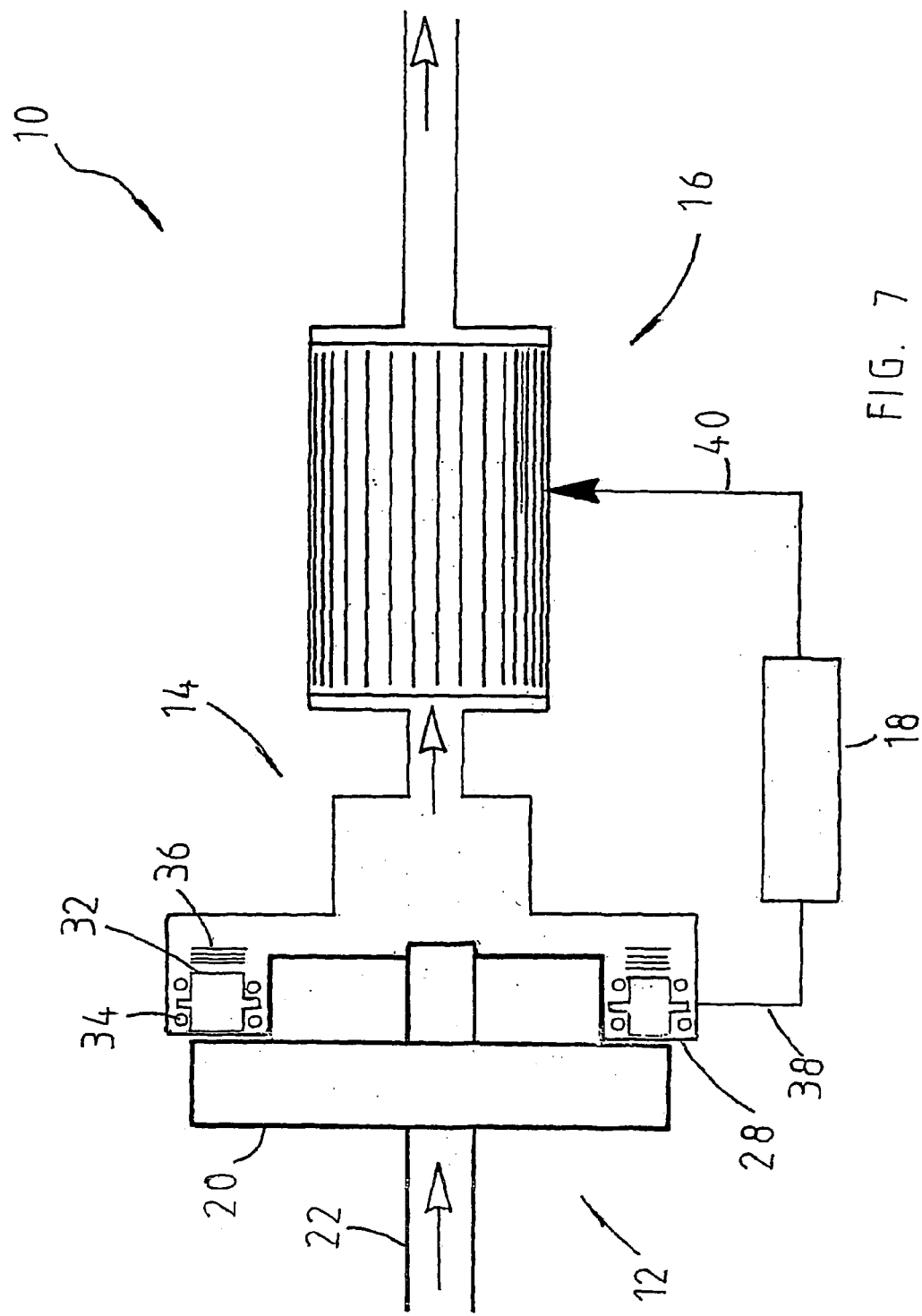
FIG. 7 is a schematic side view of another embodiment of the variable ratio torque converter according to the present invention.
Figure 8:
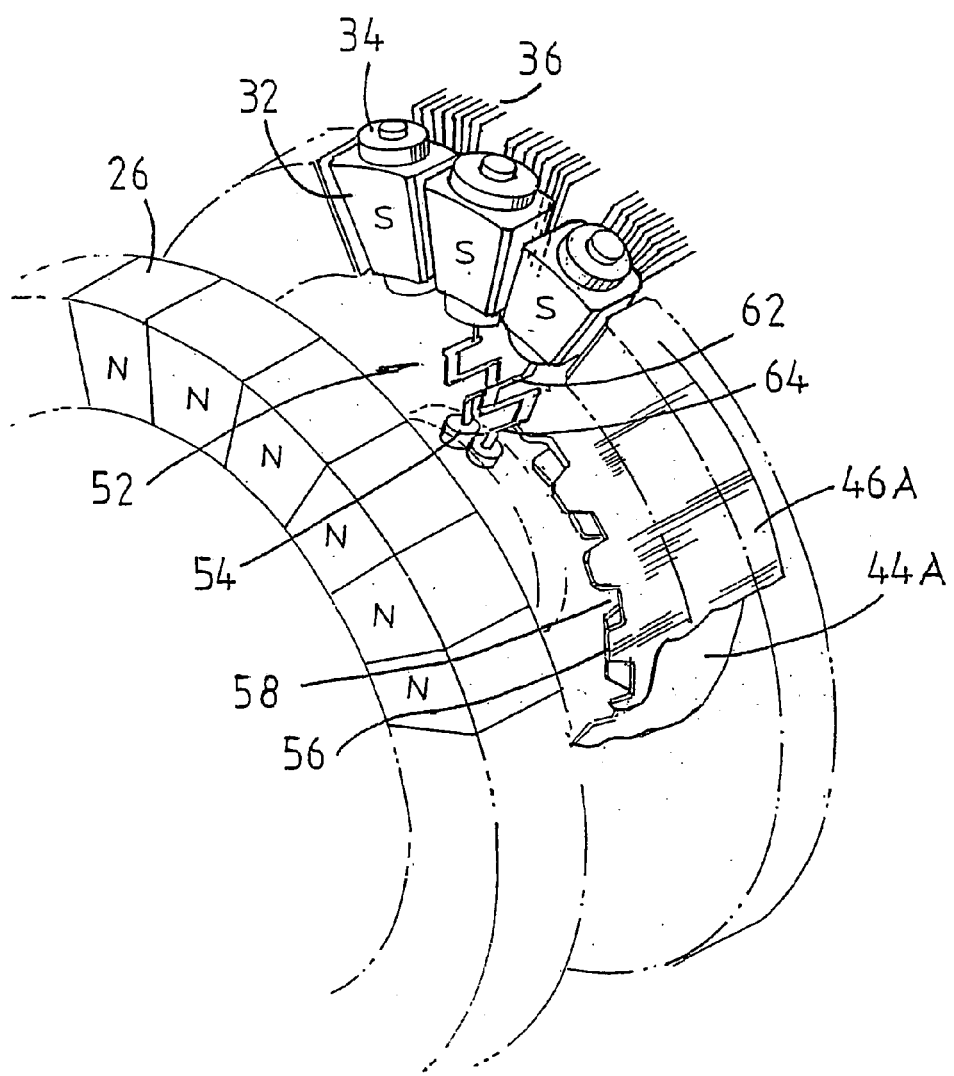
FIG. 8 shows the slip responsive actuating arrangement for turning the peripheral magnets shown in FIG. 7.

FIG. 7 shows another embodiment of the variable torque converter 10 according to the present invention. In this embodiment the rotor 20 of the input member 12 and the flange 28 of the output member 14 are in facing relationship. The peripheral magnets 32 are oriented to rotate along axes that are perpendicular to the shaft 22. The windings 36 are also positioned axially from the rotor 20. As shown more clearly in FIG. 8, the permanent poles 28 and 28 (26 only shown) are pole segments on a doughnut shaped rotor 20. The peripheral permanent magnets 32 are mounted in bearings 34 and oriented to rotate about axes perpendicular to the shaft 22. The retard arrangement also has a double crank arrangement 52 similar to that described earlier, except for the orientation. The crank members 62 and 64 are arranged to travel over the troughs 58 and the ridges 56 on the edges of rings 44A and 46A in the manner as afore described.

Figure 9:
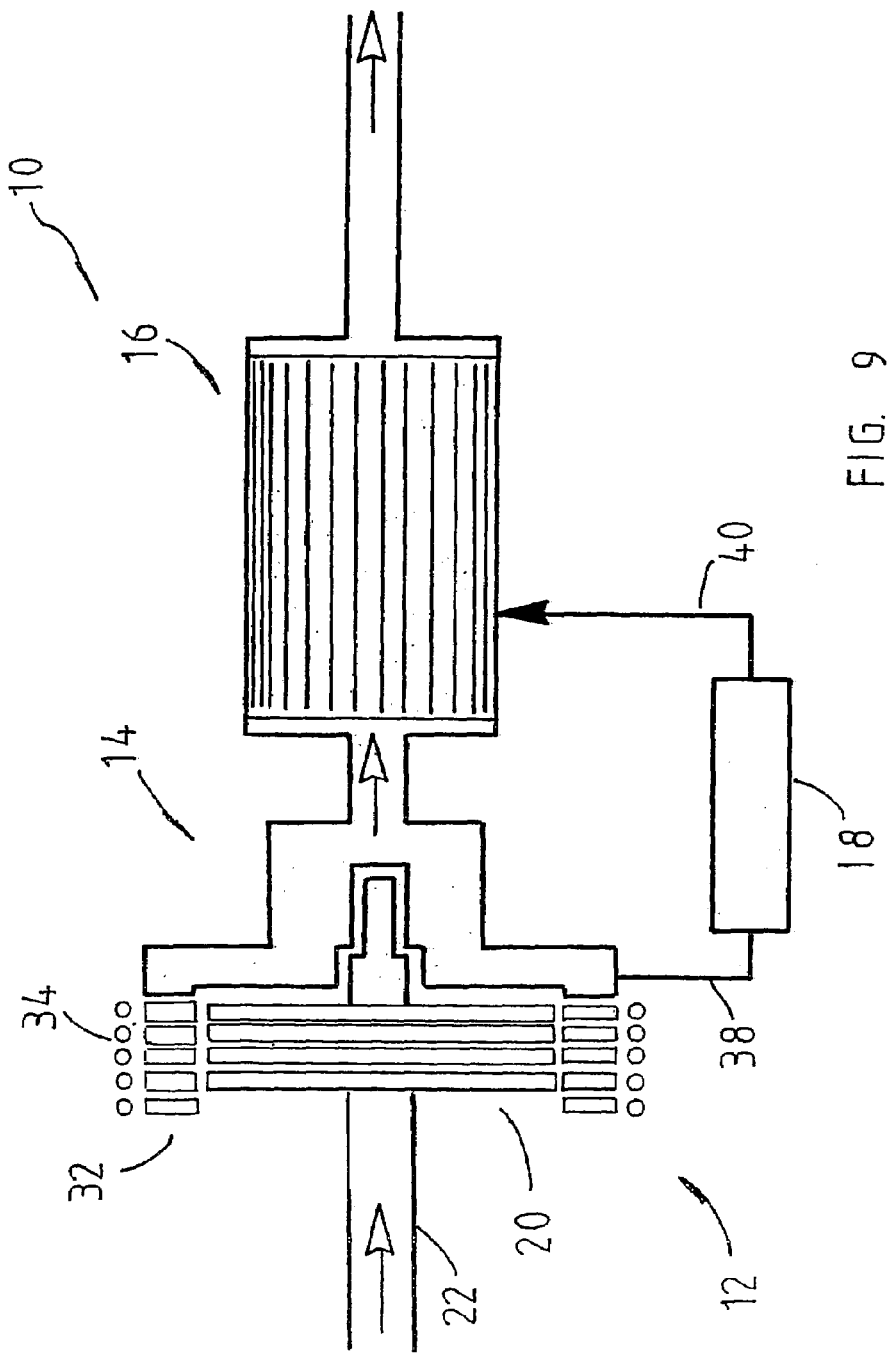
FIG. 9 is a schematic side view of a further embodiment of the variable ratio torque converter according to the present invention.
Figure 10:
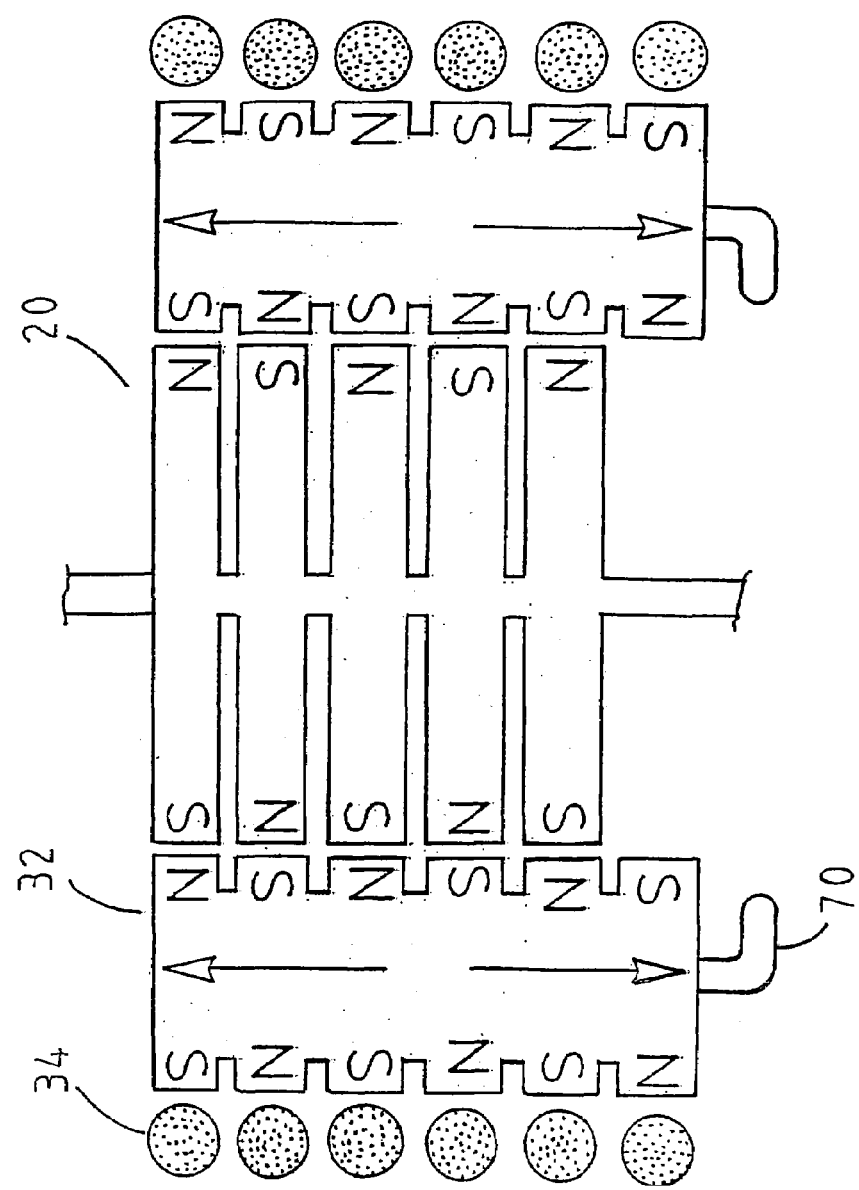
FIG. 10 is a partial cross-section view showing the magnetic poles and the peripheral magnets of the converter shown in FIG. 9.
Figure 11:
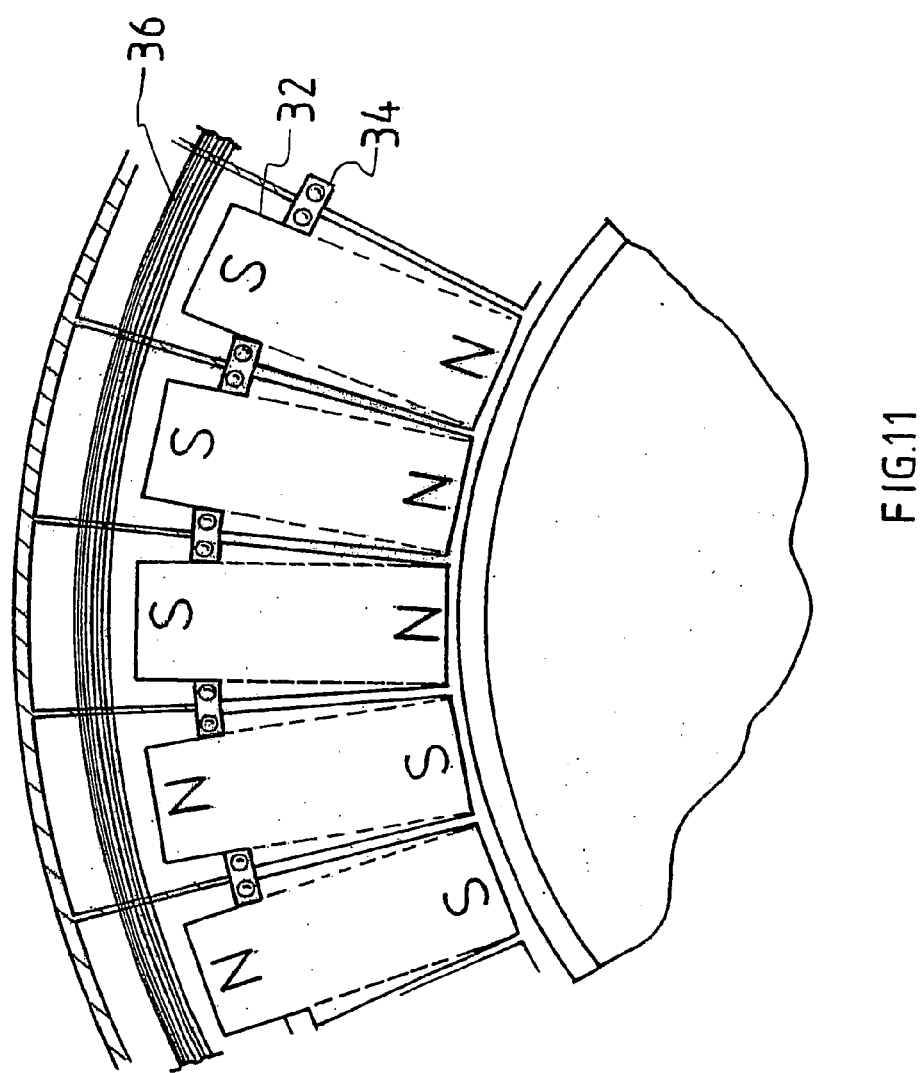
FIG. 11 is a partial end view of the output member of the converter shown in FIG. 9.
Figure 12:
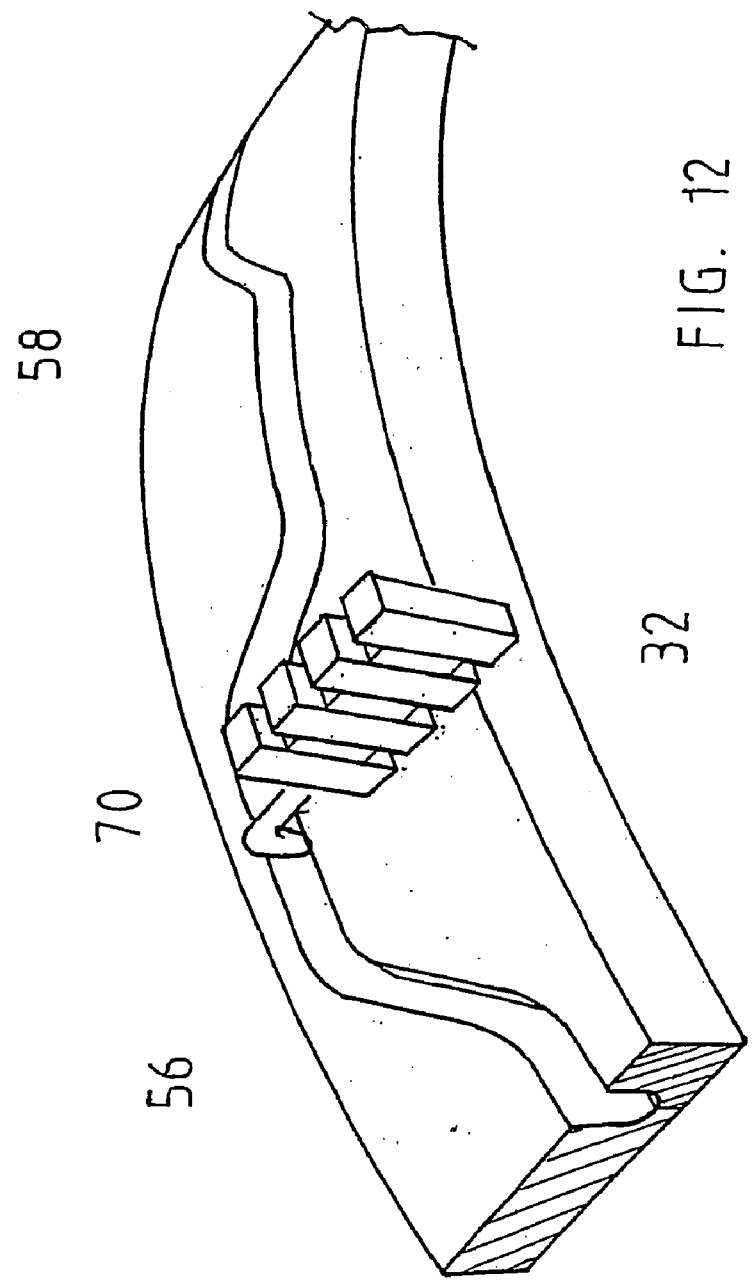
FIG. 12 shows the slip responsive actuating arrangement for causing lateral movements of the peripheral magnets shown in FIG. 9.

FIGS. 9 to 11 show a further embodiment of the converter 10 according to the present invention. In this embodiment, the rotor 20 has a number of ring-shaped spaced linearly along the rotor 20. The output member 14 also has peripheral magnets 32 arranged linearly and supported by bearings 34 which also contain centrifugal forces. Each of the groups of peripheral magnets 32 has a key member 70. As shown in FIG. 12, the key member 70 are arranged to travel along contoured grooves which define lateral movements of the peripheral magnets 32. The grooves also have ridges 56 and troughs 58 as afore described.

In the above embodiments, at the leading edge of each pole 24,26, which is a concave or convex segment of the input member 12, the peripheral magnets 32 of the output member 14 turn one by one by 180 degrees as forced by the magnetic repulsion of the concave or convex segments which may be manufactured into a ring form to contain centrifugal forces. In this state current is generated, but no control torque signal is transmitted. To control torque of the torque amplifier member 16, movement of the peripheral magnets 32 is delayed until the edge of the concave or convex segment or a pole in the ring, goes past the first peripheral magnet of each pole.

The retard arrangement 42 is adjustable like the vacuum advance mechanism on a distributor being controlled by vacuum in the manifold. The retard arrangement 42 is simple and cost effective to produce. The range of variation is from nil torque to full torque or at least 99% of the engine torque.

When the load on the output member 14 exceeds the strength of the magnets, the output member 14 slows down and the peripheral magnets 32 turn one by one, per pole and current is generated. This current is then fed into the inverter 18 to control the torque multiplying member 16. When the load on the output member 14 is reduced below a certain value, then the input and output members 12 and 14 lock up (i.e. there is no slippage) and no current is produced and the converter 10 is in virtual direct drive.

Output torque is always 1: (1+x), where x is the torque obtained from the current generated by the multiplying member 16.

The Coupler/Generator and the Torque Multiplier does not have to be "in-line". The Torque Multiplier can be positioned in any way, using bevel gears, that the manufacturer desires.

When in the locked up or virtual direct drive state, efficiency of the converter 10 is about 100%. The converter 10 handles all speed/slip ranges, including low slip state, 0–300 rpm of slip.

Components of the converter 10 can be made in a modular form for retrofitting. Suitably, each vehicle make and model must have its own unit, where the components are same or near identical with correct interface on the casing. The converter 10 may be used to accept plugin hybrid components, works as variable ratio transmission only or full hybrid.

Whilst the above has been given by way of illustrative example of the present invention many variations and modifications thereto will be apparent to those skilled in the art without departing from the broad ambit and scope of the invention as herein set forth.

What is claimed is:

1. A variable ratio torque converter including an input member for connection to a primary drive, an output member coupled to a torque multiplying member for connection to drive a load, the input member having paired magnet poles, and the output member having a plurality of pairs of movable periphery magnets per pole, and a winding arranged for each peripheral magnet pairs, the windings being connected to a controllable inverter arranged to control torque from the torque multiplying member, the input member and the output member are arranged so that the output member rotates with the input member under magnetic force, the moving peripheral magnets causing the windings to produce a slip related control signal for the inverter to control the torque from the torque multiplying member.

2. A hybrid drive for a vehicle, including an internal combustion engine and a variable ratio torque converter having an input member for connection to the engine, an output member coupled to a torque multiplying member for connection to drive at least one wheel of the vehicle, the input member having paired magnet poles, and the output member having a plurality of pairs of movable periphery magnets per pole, and a winding arranged for each peripheral magnet pairs, the windings being connected to a controllable inverter arranged to control torque from the torque multiplying member, the input member and the output member are arranged so that the output member rotates with the input member under magnetic force, the moving peripheral magnets causing the windings to produce a slip related control signal for the inverter to control the torque from the torque multiplying member.

3. The invention according to claim 1 wherein the converter further includes a slip responsive retard arrangement for retarding actuation of said peripheral magnets to thereby delay movement when there is a slip between respective speeds of the input member and the output member.

4. The invention according to claim 1 wherein the input member having an input shaft with the paired magnet poles fixed thereon and the paired magnet poles being arranged around one or more circular elements.

5. The invention according to claim 1 wherein the peripheral magnets being arranged to move in a rotational or translational manner.

6. The invention according to claim 5 wherein the peripheral magnets are arranged to rotate about respective axes which are parallel to or to move laterally from the axial axis of the input member.

7. The invention according to claim 3 wherein the slip responsive retard arrangement having at least one delay zone where a peripheral magnet therein is maintained stationary and at least one actuating zone where a peripheral magnet therein is caused to move.

8. The invention according to claim 7 wherein the delay zone(s) and the actuating zone(s) are formed with one or more contoured surfaces arranged to provide a delay before actuating said peripheral magnets to move when there is a slip between the input member and the output member.

9. The invention according to claim 8 wherein the one or more contoured surfaces are in the form of a series of alternating ridges and troughs, and the sides between the series of alternate ridges and troughs are shaped to cause the peripheral magnets to accelerate to a maximum speed and then decelerates to return to stationary.

10. The invention according to claim 3 wherein the actuating arrangement has a first disc and a second disc coupled to rotate with the input member, each of the first and second discs having a contoured circumferential surface arranged to actuate the peripheral magnets to move after a delay.

11. The invention according to claim 10 wherein the peripheral magnets having a key arranged to follow a contoured surface or crank means arranged for actuation by the contoured surfaces of the first and second discs.

12. The invention according to claim 1 wherein the torque multiplying member is a motor/generator which can be controlled to operate as a motor or as a generator.

* * * * *